June 5, 1951  K. L. JENSEN ET AL  2,555,929
CONSTANT SPEED CLUTCH GOVERNOR
Filed June 27, 1946

Inventor
Kaj L. Jensen
Kaj H. F. Jensen
Hans F. Jacobsen
By
Attorney

UNITED STATES PATENT OFFICE 2,555,929

CONSTANT SPEED CLUTCH GOVERNOR

Kaj Leo Jensen, Kaj Herman Frederik Jensen, and Hans Frederik Jacobsen, London, England Application June 27, 1946, Serial No. 679,675
In Great Britain July 27, 1945

7 Claims. (Cl. 192—104)

The present invention refers to centrifugal governors of the type comprising a governing collar which is adapted to be axially displaced in one direction by spring means and is adapted to be axially displaced in the opposite direction by governor masses and also refers to such governors when of slipping clutch type. The invention has for its object improvements making it possible for the governors to respond more quickly to external manipulations intended to affect the governed speed, while at the same time making the governor action unresponsive to unavoidable mechanical imperfections to be found in the usual constructions.

A typical slipping clutch governor is constructed as shown in side elevation in Fig. 1 of the accompanying drawings. In this figure a driving disc 1 constituting a first clutch element is driven at a speed higher than the desired highest speed by external means such as an electric motor. The driving disc or first clutch element 1 is provided with friction material, often in the form of a ring 2, as shown, against which a friction disc 3 forming a second clutch element, is pressed. The disc 3 is fixed to a governing collar or clutch actuator 4 which forms part of the centrifugal unit comprising a clutch control means in the form of a centrifugally responsive means such as masses or weights 7 carried by arms 6 and a spring 8. The collar or clutch actuator 4 fixed to friction disc 3 and a slidably movable control collar 5 have pivoted thereto the opposite outer ends of two sets of governor arms 6 which are in turn pivoted at their inner ends to the opposite ends of the governor masses 7. A governor spring 8 is disposed between the collars 4 and 5 tending to spread them and all are mounted on a governor spindle or driven shaft 9, which latter has one bearing in the first clutch element or driving disc 1 and another in an external frame, not shown.

The collar 5 of the clutch control means is slidable on the governor spindle or driven shaft 9 and has an extended portion with a groove 10 into which fits the two prongs of a control bar 11.

The torque resulting from the friction coupling between friction ring 2 of the first clutch element or driving disc 1 and friction disc 3 fixed to clutch actuator collar 4, is transmitted to the driven shaft or governor spindle 9 by way of the arms and governor masses by a key or feather fixed in control collar 5 engaging a keyway or groove in the spindle 9.

The control bar 11 is operated by an external, often cam-controlled, arrangement and for a given speed will be situated a given distance from the second clutch element or friction disc 3. If this distance be reduced the speed of the driven shaft or output spindle 9 will increase and again be constant at a higher speed corresponding to the governor masses or weights 7 having to compress the governor spring 8 further, the configuration of the arms, masses and spring always being such that the compression of the spring is balanced by the centrifugal forces acting on the governor masses except for the excess pressure which is required for transmitting the output torque.

If the faces of the end turns of the spring are not flat, (i. e. not truly at right angles to the axis of the shaft), the reaction of the spring on the clutch actuator collar 4 to which friction disc 3 is fixed will not be in the exact axial direction, but will have a component tending to tilt the sleeve 12 of the clutch actuator collar 4, and friction disc 3 fixed thereto, on the spindle, and a frictional force between the sleeve and the collar will result. The consequence of this is that the governing action of the centrifugal unit becomes uncertain. In addition, the response of the centrifugal unit is sluggish to external speed setting correction applied when the governor is required to operate at a speed identical with another speed. External speed setting correction is applied by displacing the clutch control means i. e. the collar 5 in one direction or the other by a mechanism controlled by the difference of the two speeds which it is intended should be nearly identically equal.

Even when the end planes of the governor spring are exactly at right angles to the axis of the spring when the spring is, for instance, fully extended, compression of the spring causes this relationship no longer to hold good.

This defect is overcome by the provision, in accordance with the invention, of a universally movable, spring pressure transmitting element between the collar and the corresponding end of the spring which universally movable element is adapted, in effect, to cause the governor spring to react on the collar at a point in the axis of the spindle.

A simple and highly satisfactory element comprises a pressure disc or ring provided on its sides either with four point-contact projections or with four radial line-contact projections arranged two projections diametrically opposite each other on one side and, 90° around the axis of the ring, two projections diametrically opposite each other on the other side. This ring is arranged co-axially of the collar. Two of the projections contact with a force-transmitting element on one side such as the collar and the two projections at the other side contact with the adjacent end of the spring.

A governor like that shown in Fig. 1 but incorporating a four-projection ring or pressure disc and incorporating other improvements will now be described with reference to Figs. 2 to 5 of the accompanying drawings.

In Fig. 2 parts corresponding to those shown in Fig. 1 have like reference numerals and need no further description.

Figure 1:
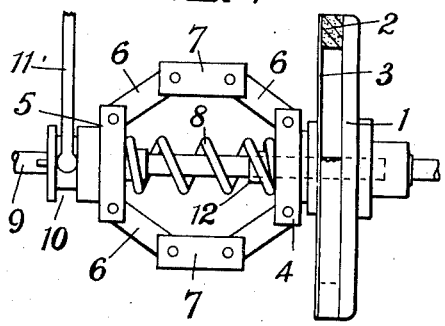

The universally movable pressure transmitting elements are indicated at 13. They comprise rings or discs 13 having four mounted projections which may be pointed as shown, two marked 14 on one side and two marked 15 on the other side, the projections on one side being offset by 90° with respect to those on the other side. The disc or ring is interposed between the governor spring 8 and the sliding actuator or collar 4 and is co-axial with the collar. It will be realised that this ring acts as a universal joint over which the pressure of the spring is communicated to the collars, and any other form of universal joint capable of transmitting axial thrust may be employed, to effect the same result, in place of the simple ring shown.

In order to reduce the friction of the clutch control collar 5 to a minimum, a similar disc or ring 13ª is inserted at that end of the governor configuration.

Figure 5:
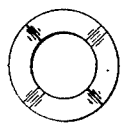
Fig. 5 is a face view of a four line-contact ring.

Instead of the projections on the rings being of point form they may be of radial line form as indicated by 14' and 15' on the ring 13', Fig. 5.

It will be seen that, apart from the general governor performance being improved, the lessening of friction between sleeve 12 and spindle 9 makes the governor very sensitive (responsive) to speed adjustment for operation at various speeds; such adjustment is effected by moving control arm 11 sideways. If, for instance, control arm 11 is moved to the left, the pressure of friction disc 3 on friction ring 2 should immediately decrease, to allow the speed to rise; but it would not do so if there were friction between sleeve and spindle.

The increased sensitivity obtained by the above use of the ring 13 makes a further modification to the slipping clutch governor construction highly desirable for the following reason. When the governor is running at, for instance, half the speed of the driving disc 1, it is apt to show erratic variation of phase. This can be explained on the supposition that friction disc 3 and the friction surface of the friction material 2 are not running absolutely parallel relatively as it is not possible to make the two surfaces exactly parallel when the normal construction as shown in Fig. 1 is employed. The same phenomenon may be observed when the governor speed is ¾, ⅜, ¼, ½ or other subharmonic of the driving disc speed.

The invention also comprises, therefore, a centrifugal governor of slipping clutch type comprising an actuator or governing collar which is connected to one of the members of the slipping clutch 2, 3 and is adapted to be axially displaced in one direction by spring means and in the opposite direction by governor masses, provided between the actuator or collar and the corresponding end of the spring with a universally movable, spring pressure transmitting element which, in effect, causes the governor spring to react on the actuator or collar at a point in the axis of the spindle and also provided either in the connection between the said actuator or collar and the said second clutch element or one member of the slipping clutch or in the connection between the first clutch element and the other member of the clutch or the driving shaft with a joint permitting of limited universal movement of the said clutch element in relation to a plane normal to the axis of the actuator. Thus, by introducing a universal joint suspension of the second clutch element or friction disc 3 on the actuator collar (or of the first clutch element or driving disc 1 on the driving shaft or spindle), the two surfaces are able to obtain such parallelism that the one follows the other completely and the phase shifts caused by uneven contact disappear for all practical purposes.

Figure 2:
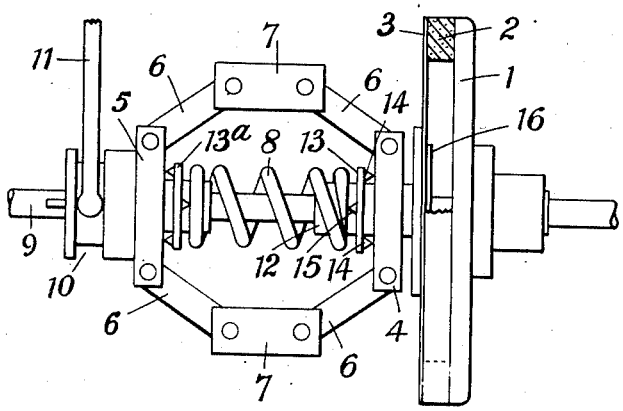
Fig. 2 is a side elevation of the improved governor.
Figure 3:
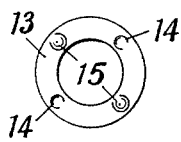
Fig. 3 is a face view of the four point-contact ring shown in Fig. 2.
Figure 4:
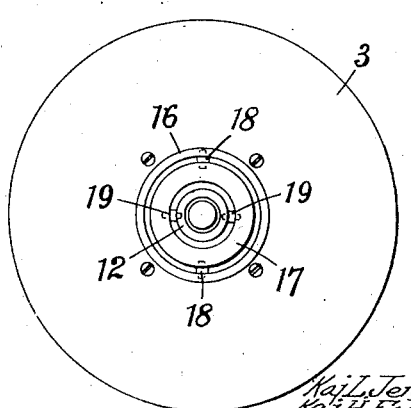
Fig. 4 is a face view of the friction disc and a universal joint thereon shown in Fig. 2.

The suspension of discs as described above may take the practical form shown in Figs. 2 and 4. In these figures the disc 3 is fixed to an outer ring 16 which is connected to an intermediate ring 17, by means of pivot elements 18; and ring 17 is connected by means of pivot elements 19 to the sleeve 12.

The invention has been described as applied to the typical governor shown in Fig. 1 for convenience but it is to be understood that the invention is not limited in its application to centrifugal governors of the slipping clutch type since the features of the invention are equally applicable to governors for regulating the operations of prime movers for example steam or internal combustion engines or electric motors, the actuator or collar 4 being linked through suitable connections to the engine throttle or other equivalent speed regulating means therefor.

What we claim is:

1. A slipping clutch centrifugal governor, comprising, in combination, a driving shaft, a first clutch element driven thereby, a second clutch element having frictional slip engagement with said first clutch element to be driven thereby at a lower speed by frictional slip, an actuator for pressing the clutch elements into slipping driving engagement, a freely movable universal joint connection between the second clutch element and the actuator to permit thrust and torque transmission from the latter to said second clutch element, a driven shaft, clutch control means slidable on said shaft, a spring positioned between the control means and the actuator to transmit thrust from the control means to the actuator, and universally movable pressure transmitting elements between said actuator and the one end of said spring and between said control means and the other end of the spring, respectively.

2. A slipping clutch centrifugal governor, comprising, in combination, a driving shaft, a first clutch element thereon, a second clutch element having frictional slip engagement with said first clutch element to be driven thereby at a lower speed by frictional slip, an actuator for pressing the clutch elements into slipping driving engagement, a freely movable universal joint connection between the second clutch element and the actuator to permit thrust and torque transmission from the latter to the said second clutch element, a driven shaft, clutch control means adjustable relative to said shaft, centrifugally responsive means for moving the actuator toward the clutch control means to reduce the pressure between said clutch elements, a spring between the control means and the actuator and biasing the clutch control means and the actuator apart to increase the pressure between the clutch elements, and universally movable pressure transmitting elements between said actuator and the one end of said spring and between said clutch control means and the other end of the spring, respectively.

3. A slipping clutch centrifugal governor, comprising, in combination, a driving shaft, a first clutch element driven thereby, a second clutch element having frictional slip engagement with said first clutch element to be driven thereby at a lower speed by frictional slip, an actuator for effecting the engagement of the clutch elements, an intermediate ring within the second clutch element, pivot elements between said intermediate ring and said second clutch elements and between said ring and said actuator, said pivot-elements being positioned so that the second clutch element is universally movable which permits thrust and torque transmission to the said second clutch element, a driven shaft clutch control means slidable on said shaft, a spring positioned between the control means and the actuator to transmit thrust from the control means to the actuator, and universally movable pressure transmitting elements between said actuator and the one end of said spring and between said control means and the other end of the spring, respectively.

4. A slipping clutch centrifugal governor, comprising, in combination, a driving shaft, a first clutch element driven thereby, a second clutch element having frictional slip engagement with said first clutch element to be driven thereby at a lower speed by frictional slip, an actuator for pressing the clutch elements into slipping driving engagement, a freely movable universal joint connection between the second clutch element and the actuator to permit thrust and torque transmission from the latter to the said second clutch element, a driven shaft, clutch control means slidable on said shaft, a spring positioned between the control means and the actuator to transmit thrust from the control means to the actuator, pressure discs between said actuator and the one end of said spring and between said control means and the other end of the spring respectively, and projections on both faces of said discs and being disposed to permit universal movement.

5. A slipping clutch centrifugal governor according to claim 4 wherein the discs include diametrically disposed contact projections on both faces, those on one face being at 90° to those on the other face.

6. A slipping clutch centrifugal governor according to claim 4 wherein said projections are of the line contact type.

7. A slipping clutch centrifugal governor according to claim 4 wherein said projections are of the point contact type.

KAJ LEO JENSEN.
KAJ HERMAN FREDERIK JENSEN.
HANS FREDERIK JACOBSEN.

REFERENCES CITED

The following references are of record in the file of this patent:

UNITED STATES PATENTS

| Number | Name | Date |
| --- | --- | --- |
| 1,815,760 | Burns | July 21, 1931 |
| 1,936,924 | Waude | Nov. 28, 1933 |
| 1,976,304 | Stoiber | Oct. 9, 1934 |
| 1,995,390 | Hubbard | Mar. 26, 1935 |
| 2,090,787 | Eberhard | Aug. 24, 1937 |
| 2,276,467 | Cotta | Mar. 17, 1942 |
| 2,282,366 | Knight et al. | May 12, 1942 |
| 2,342,880 | Masek | Feb. 29, 1944 |
| 2,374,434 | Jenson | Apr. 24, 1945 |

FOREIGN PATENTS

| Number | Country | Date |
| --- | --- | --- |
| 398,434 | Great Britain | Sept. 14, 1933 |